(12) United States Patent
Erjawetz et al.

(10) Patent No.: US 8,381,864 B2
(45) Date of Patent: Feb. 26, 2013

(54) SUPPORT AND DRIVE ARRANGEMENT

(75) Inventors: Konstantin Erjawetz, Graz (AT);
Helfried Müller, Weinzettl (AT);
Alexander Rabofsky, Graz (AT)

(73) Assignee: Magna Steyr Fahrzeugtechnik AG & Co KG, Graz (AT)

( * ) Notice: Subject to any disclaimer, the term of this patent is extended or adjusted under 35 U.S.C. 154(b) by 216 days.

(21) Appl. No.: 12/854,229

(22) Filed: Aug. 11, 2010

(65) Prior Publication Data

US 2011/0036659 A1 Feb. 17, 2011

Related U.S. Application Data

(60) Provisional application No. 61/232,801, filed on Aug. 11, 2009.

(51) Int. Cl.
*B60K 6/20* (2007.10)
(52) U.S. Cl. .................................. 180/291; 180/300
(58) Field of Classification Search .............. 180/291, 180/292, 299, 300
See application file for complete search history.

(56) References Cited

U.S. PATENT DOCUMENTS

| 7,222,692 | B2 * | 5/2007 | Masuda ..................... 180/291 |
| 7,413,050 | B2 * | 8/2008 | Miyagawa et al. .......... 180/291 |
| 7,562,737 | B2 * | 7/2009 | Miyahara et al. ........... 180/291 |
| 7,588,117 | B2 * | 9/2009 | Fukuda ....................... 180/291 |
| 8,058,849 | B2 * | 11/2011 | Yoshida et al. ............. 322/13 |
| 2005/0107198 | A1 * | 5/2005 | Sowul et al. ............... 475/5 |

FOREIGN PATENT DOCUMENTS

JP 11099834 A * 4/1999

* cited by examiner

*Primary Examiner* — John Walters
(74) *Attorney, Agent, or Firm* — Jordan IP Law, LLC; Todd A. Vaughn

(57) ABSTRACT

A support and drive arrangement for an electrically driven vehicle or a hybrid-electrically driven vehicle. The support and drive arrangement includes a cross beam having at least two attachment sections permitting the attachment of the cross beam to a vehicle support structure, and at least one electrical drive unit connected to the cross beam via at least one elastic drive mount.

20 Claims, 3 Drawing Sheets

SUPPORT AND DRIVE ARRANGEMENT

CROSS-REFERENCE TO RELATED APPLICATIONS

Figure 1:
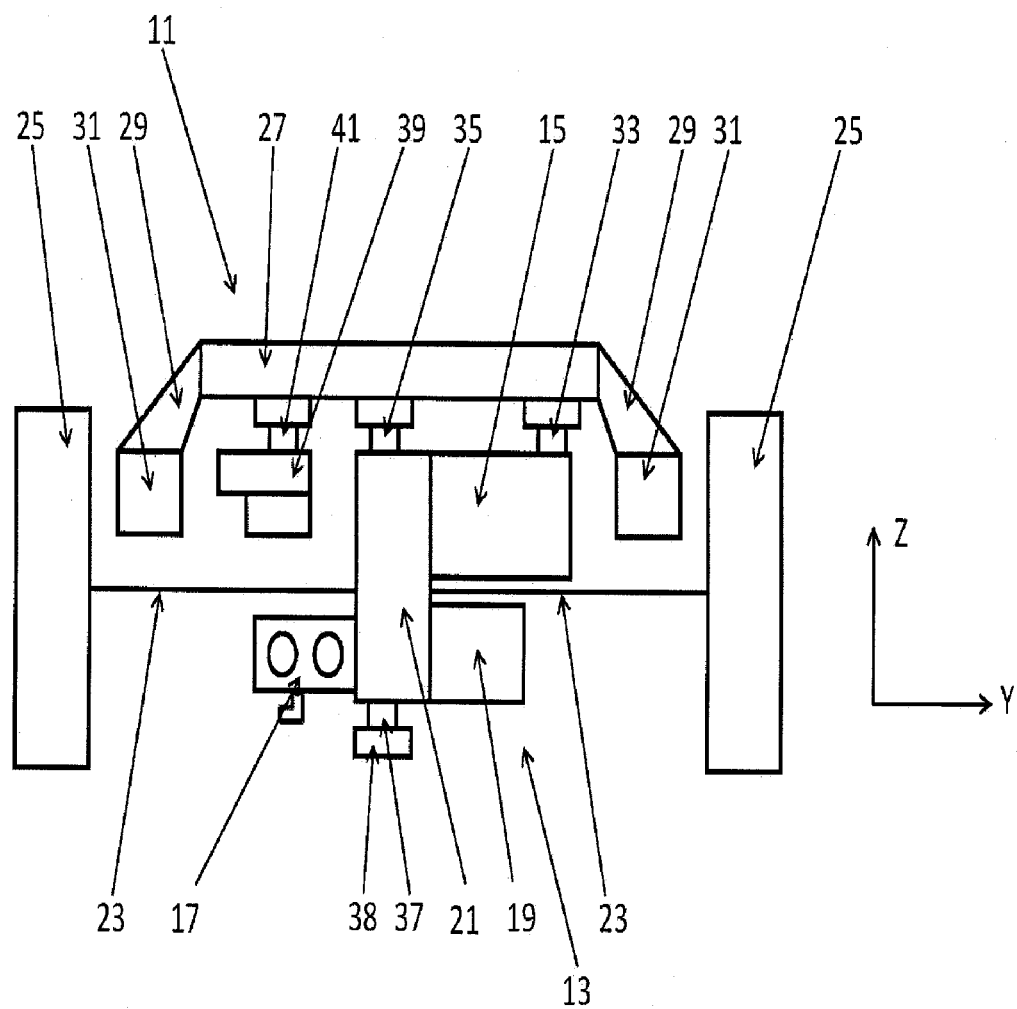

The present application claims priority under 35 U.S.C. §119 to U.S. Provisional Patent Application No. 61/232,801 (filed on Aug. 11, 2009), the full contents of which is hereby incorporated by reference in its entirety.

BACKGROUND

In a motor vehicle driven solely by electrical power, one or multiple electrical drive units are provided. In a hybrid electrically-driven motor vehicle, at least one additional and different drive assembly is provided as an auxiliary to the electrical drive unit, the assembly being particularly an internal combustion engine.

In such vehicles, a suitable support arrangement serves to attach the drive assembly to the vehicle support structure, the same also being called the vehicle sub-frame or the body structure of the motor vehicle.

SUMMARY

Embodiments are related to a support and drive arrangement which enables a flexible arrangement of the arrangement in an electrically driven motor vehicle or a hybrid electrically driven motor vehicle, and allows an acoustical uncoupling of the assembly from the vehicle support structure while offering enhanced stability.

In accordance with embodiments, a support and drive arrangement can include at least one of the following: a cross beam having at least two attachment sections which rigidly attaches the cross beam to a vehicle support structure, and at least one electrical drive unit which is secured to the cross beam via at least one elastic drive mount.

In accordance with embodiments, a support and drive arrangement for a hybrid-electrically driven vehicle can include at least one of the following: a cross beam attached to a vehicle support structure; a first electrical drive unit connected to the cross beam; a gear unit connected to the cross beam and the first electrical drive unit; and an internal combustion engine connected to the gear unit.

In accordance with embodiments, a support and drive arrangement for a hybrid-electrically driven vehicle can include at least one of the following: a cross beam having attached to a vehicle support structure; a first electrical drive unit directly connected to the cross beam via a first elastic mount; an internal combustion engine indirectly connected to the cross beam, a second electrical drive unit indirectly connected to the cross beam, and a gear unit directly positioned intermediate between the cross beam and the internal combustion engine and also the second electrical drive unit, such that the gear unit is directly connected to the cross beam via a second elastic mount and operatively connected to the first electrical drive unit, the second electrical drive unit and the internal combustion engine.

In accordance with embodiments, the cross beam may be rigidly connected or otherwise attached, for example, bolted or welded, to the vehicle support structure via the attachment sections. As such, an advantageous stiffening of the body shell is achieved, i.e., the rigidity of the vehicle support structure is enhanced. In turn, it is possible to reduce weight elsewhere in the design of the chassis.

The cross beam in accordance with embodiments also enables the coupling of different drive assemblies on the same vehicle support structure, for example, the coupling of electrical drive units having different sizes (for a solely electric drive, or for a so-called "range extender" hybrid drive), or the addition of an internal combustion engine. The arrangement of each drive assembly is more flexible within the available construction space. The provision of at least one elastic drive mount between the cross beam and the electrical drive unit also allows the acoustic uncoupling of the assembly from the vehicle support structure. In addition, such a support- and drive arrangement enables the additional attachment of auxiliary assemblies in a flexible and acoustically uncoupled manner.

In accordance with embodiments, for a hybrid electric vehicle, the electrical drive unit can be secured directly on the cross beam via the aforementioned at least one elastic drive mount. The support and drive arrangement also has an internal combustion engine which is likewise attached to the electrical drive unit in such a manner that permits the internal combustion engine to be attached only indirectly to the cross beam via the electrical drive unit and the aforementioned at least one elastic drive mount. Accordingly, the internal combustion engine is not directly connected to the cross beam, and thus, provides a so-called floating mount. Moreover, the internal combustion engine may not necessarily be attached to the electrical drive unit directly, but rather an indirect connection can be provided, for example, via a gear unit.

Such a design enables a particularly flexible arrangement, i.e., free positioning of the internal combustion engine within the available construction space. In such a design, no dedicated receiving mount may be provided between the internal combustion engine and the vehicle support structure, or at least the number of such receiving mounts can be significantly reduced. Primarily, such a design ensures that the internal combustion engine is not loaded with forces from the chassis frame which can be transmitted via the vehicle support structure.

In accordance with embodiments, the internal combustion engine can be rigidly connected to the electrical drive unit. Consequently, no additional uncoupling device, i.e., no additional elastic mount, is required between the internal combustion engine and the electrical drive unit.

In accordance with embodiments, the support and drive arrangement can also have a gear unit which is attached to the cross beam via at least one elastic gear unit mount to permit an internal combustion engine to be rigidly connected to the gear unit in such a manner that the internal combustion engine is also only indirectly secured to the cross beam via the gear unit and via the at least one elastic gear unit mount. Accordingly, the gear unit serves as an additional intermediate element between the internal combustion engine and the cross beam, in order to allow a more flexible arrangement of the internal combustion engine in the available construction space while affording high stability. An additional mounting point between the internal combustion engine and the cross beam can be provided in this case by the elastic gear unit mount, providing for acoustic uncoupling.

In addition to the indirect and acoustically uncoupled connection of the internal combustion engine to the cross beam via the at least one elastic drive mount, and optionally via the at least one elastic gear unit mount, the internal combustion engine can be attached to the vehicle support structure via at least one additional elastic drive mount, bypassing the cross beam. The additional attachment of the internal combustion engine to the vehicle support structure can be designed as a direct or an indirect attachment, particularly via the gear unit.

In accordance with embodiments alternatively, an internal combustion engine can also be provided for a hybrid electric vehicle, the internal combustion engine being directly attached to the cross beam via the at least one elastic drive mount, with the electrical drive unit being attached to the internal combustion engine in such a manner that the electrical drive unit is only indirectly attached to the cross beam via the internal combustion engine and via the at least one elastic drive mount. In other words, the arrangement of the internal combustion engine and the electrical drive unit can be swapped, the internal combustion engine being arranged between the electrical drive unit upstream and the cross beam downstream, this sequence being given with respect to the direction in which power is transmitted. In this way, it is possible to freely position the electrical drive unit, i.e., provide a flexible arrangement with respect to the same within the available construction space.

In accordance with embodiments, additionally or alternatively to the above-described embodiment, the support and drive arrangement can also have at least one auxiliary assembly, for example, an air-conditioning compressor, a power steering pump, or a water pump. Preferably, the at least one auxiliary assembly is attached to the cross beam via a rigid connection or an elastic mount. In essence, each auxiliary assembly present can be consequently attached to the electrical drive unit and optionally to the internal combustion engine only indirectly via the cross beam. Accordingly, the cross beam enables a simpler pre-assembly of the support and drive arrangement, particularly in the case of multiple auxiliary assemblies. In addition, the necessary holders for the auxiliary assemblies can have a simpler design if the auxiliary assemblies must not be attached to a housing for the electrical drive unit, to a housing for the internal combustion engine, or to a gear unit.

It can be particularly advantageous if each auxiliary assembly is directly attached to the cross beam via an elastic mount. In this way, noise-vibration-harshness (NVH) problems are further reduced. This is particularly important if an electrical drive unit is used, because the same is significantly quieter when the vehicle is stationary than an internal combustion engine.

DRAWINGS

Figure 2:
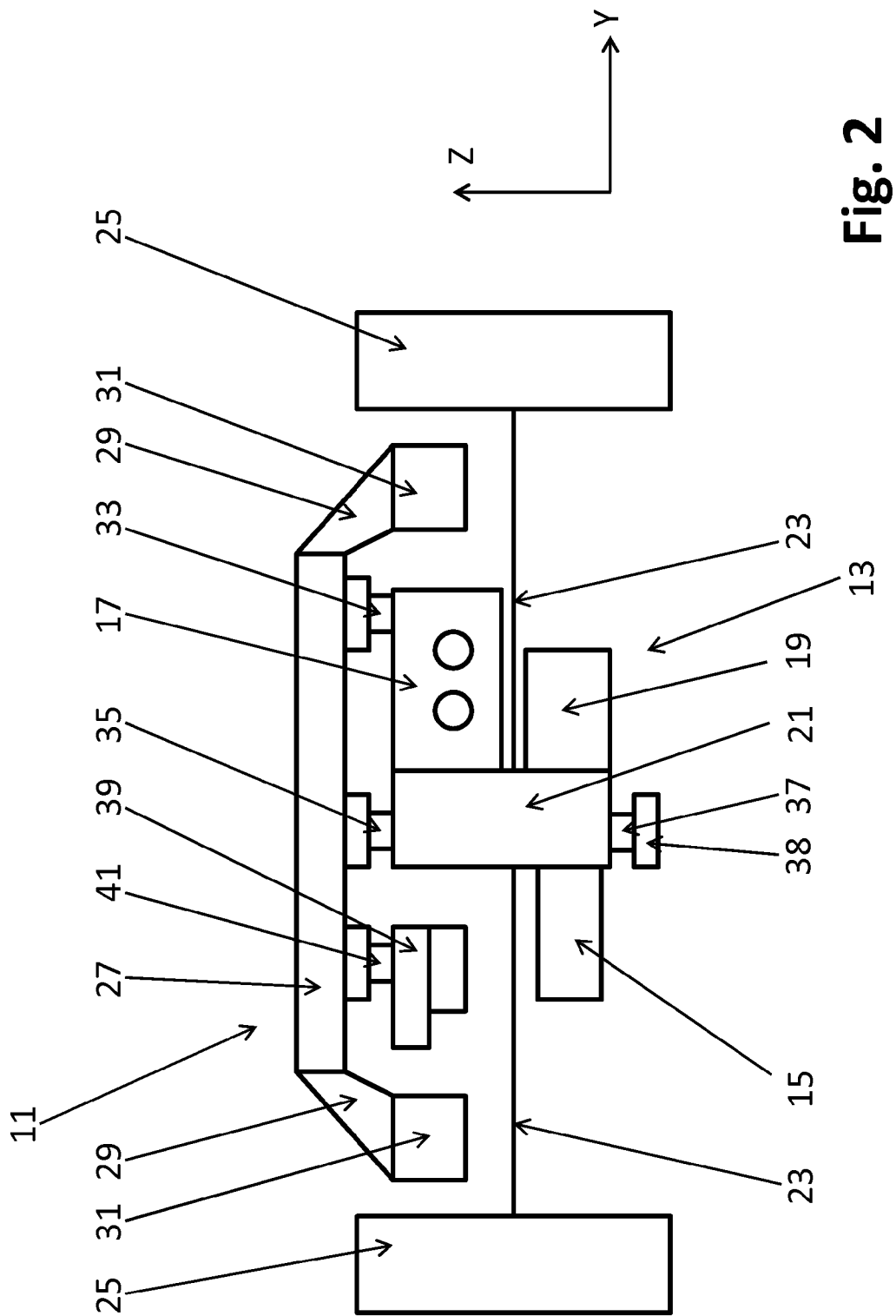
Figure 3:
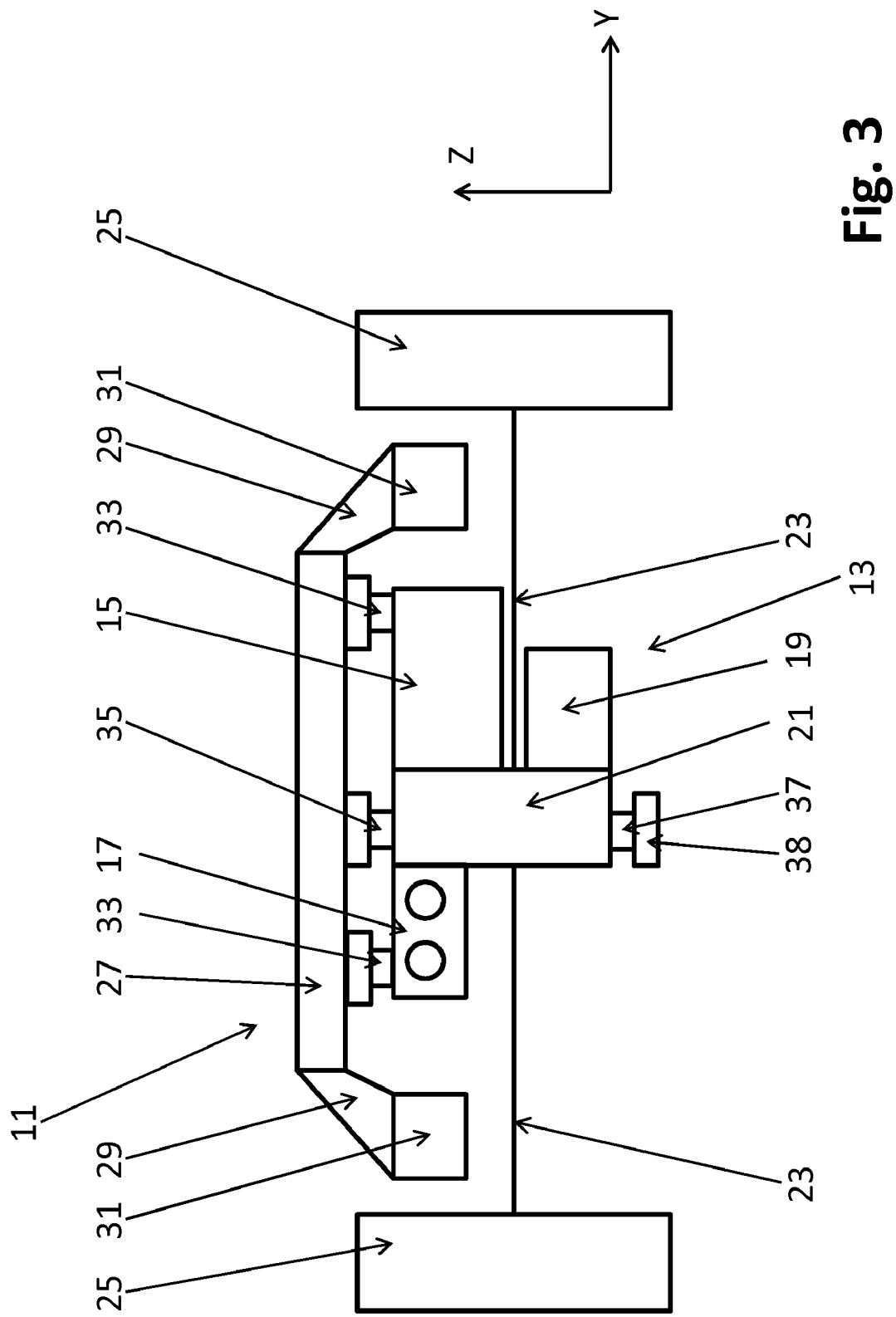

Example FIGS. 1 to 3 respectively illustrate a schematic cross-section of a hybrid electric vehicle having a support and drive arrangement, in accordance with embodiments.

DESCRIPTION

As illustrated in example FIG. 1, in accordance with embodiments support and drive arrangement 11 has drive assembly 13 with first electrical drive unit 15, internal combustion engine 17, an optional second electrical drive unit 19, and gear unit 21. First electrical drive unit 15, internal combustion engine 17 and second electrical drive unit 19 can be rigidly connected to each other. Such a connection, however, is not a direct connection, but rather indirectly via the centrally arranged gear unit 21.

Gear unit 21 serves to unify the drive torque generated by first electrical drive unit 15, internal combustion engine 17, and second electrical drive unit 19, to then distribute the total drive torque to a pair of drive shafts 23. Via shafts 23, the drive torque is transmitted along a respective horizontal transverse axis Y to wheels 25 of the respective vehicle axle. Gear unit 21 can effect an additional translation of each drive torque, particularly a translation of the drive torque generated by internal combustion engine 17 in accordance with multiple gear steps.

Support and drive arrangement 11 also has cross beam 27, which is attached to vehicle support structure 31 in a rigid manner via a pair of attachment sections 29. In accordance with embodiments, cross beam 27 is attached to a pair of longitudinal beams of vehicle support structure 31 in a front end area of the vehicle.

Drive assembly 13 is attached to cross beam 27 in a manner which uncouples the same acoustically. As such, first electrical drive unit 15 is directly attached to cross beam 27 via first elastic drive mount 33. In addition, gear unit 21 is directly attached to cross beam 27 via second elastic gear unit mount 35. In contrast, internal combustion engine 17 and second electrical drive unit 19 are only indirectly attached to cross beam 27, particularly via gear unit 21 and elastic gear unit mount 35 on one side, and via gear unit 21, first electrical drive unit 15, and elastic drive mount 33 on the other side. Internal combustion engine 17 and second electrical drive unit 19 are also attached to section 38 of vehicle support structure 31 via gear unit 21 and third elastic drive mount 37. In accordance with embodiments, drive assembly 13 is situated spatially below cross beam 27 with respect to vertical axis Z.

In accordance with embodiments, multiple auxiliary assemblies can be directly attached to cross beam 27 separately from the drive arrangement, although only one such auxiliary assembly 39 is exemplified in the illustration. Auxiliary assembly 39 is attached to cross beam 27 via elastic mount 41, and is consequently uncoupled acoustically from cross beam 27.

Cross beam 27 enables the attachment of different drive assemblies, for example, first electrical drive unit 15, internal combustion engine 17 and electrical drive unit 19, to vehicle support structure 31, with positioning of the drive assemblies made as free as possible, such that vehicle support structure 31 can not only be equipped with different types of combinations of drive assemblies in an especially flexible manner, but also the available construction space can be optimally exploited. The rigid connection of cross beam 27 to vehicle support structure 31 effects an advantageous strengthening of the vehicle chassis. At the same time, the intermediate positioning of first elastic mount 33, second elastic mount 35 and third elastic mount 37 may permit an acoustic uncoupling of drive arrangement 13 from vehicle support structure 31. Additionally, at least one auxiliary assembly 39 can likewise be attached or otherwise connected to cross beam 27 with the most flexible possible positioning thereof.

In accordance with embodiments, it should be noted that, in the case of a vehicle driven solely by electric power, internal combustion engine 17 can be left out. Optionally, second electrical drive unit 19 and/or gear unit 21 can be left out.

In accordance with embodiments, alternatively, the spatial arrangement of first electrical drive unit 15 and internal combustion engine 17 can be swapped, i.e., internal combustion engine 17 can be directly attached or otherwise connected to cross beam 27 via first elastic drive mount 33, and first electrical drive unit 15 can be attached or otherwise connected to internal combustion engine 17 via gear unit 21, and thus, only indirectly attached to cross beam 27.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A support and drive arrangement for at least one of an electrically driven vehicle and a hybrid-electrically driven vehicle, the support and drive arrangement comprising:
   a cross beam having at least two attachment sections permitting the attachment of the cross beam to a vehicle support structure;
   at least one electrical drive unit connected to the cross beam via at least one first elastic mount; and
   at least one auxiliary assembly directly connected to the cross beam.

2. The support and drive arrangement of claim 1, wherein the at least one electrical drive unit is directly connected to the cross beam via the at least one first elastic mount.

3. The support and drive arrangement of claim 2, further comprising an internal combustion engine connected to the electrical drive unit in such a manner that the internal combustion engine is only indirectly connected to the cross beam via the electrical drive unit and the at least one first elastic mount.

4. The support and drive arrangement of claim 3, further comprising a gear unit directly connected to the cross beam via at least one second elastic mount, wherein the internal combustion engine is connected to the gear unit in such a manner that the internal combustion engine is also only indirectly connected to the cross beam via the gear unit and the at least one second elastic mount.

5. The support and drive arrangement of claim 4, wherein the gear unit is connected to the vehicle support structure via at least one third elastic mount.

6. The support and drive arrangement of claim 1, further comprising an internal combustion engine connected directly to the cross beam via the at least one first elastic mount, wherein the electrical drive unit is attached to the internal combustion engine in such a manner that the electrical drive unit is only indirectly connected to the cross beam via the internal combustion engine and the at least one first elastic mount.

7. The support and drive arrangement of claim 1, wherein each at least one auxiliary assembly is directly connected to the cross beam via a fourth elastic mount.

8. The support and drive arrangement of claim 1, wherein the cross beam is arranged in a front end area of the at least one electrically driven vehicle and hybrid-electrically driven vehicle.

9. The support and drive arrangement of claim 1, wherein the attachment sections of the cross beam are attached to a respective longitudinal beam of the vehicle support structure.

10. A support and drive arrangement for a hybrid-electrically driven vehicle, the support and drive arrangement comprising:
    a cross beam attached to a vehicle support structure;
    a first electrical drive unit connected to the cross beam;
    a second electrical drive unit connected to the cross beam;
    a gear unit connected to the cross beam and the first electrical drive unit; and
    an internal combustion engine connected to the gear unit.

11. The support and drive arrangement of claim 10, wherein the first electrical drive unit is directly connected to the cross beam via a first elastic mount.

12. The support and drive arrangement of claim 10, wherein the first electrical drive unit is indirectly connected to the cross beam.

13. The support and drive arrangement of claim 10, wherein the gear unit is directly connected to the cross beam via a second elastic mount.

14. The support and drive arrangement of claim 10, wherein the internal combustion engine is directly connected to the gear unit and indirectly connected to the cross beam via the gear unit and the at least one second elastic mount.

15. The support and drive arrangement of claim 10, wherein the second electrical drive unit is directly connected to the gear unit and indirectly connected to the cross beam via the gear unit and the at least one second elastic mount.

16. A support and drive arrangement for a hybrid-electrically driven vehicle, the support and drive arrangement comprising:
    a cross beam having attached to a vehicle support structure;
    a first electrical drive unit directly connected to the cross beam via a first elastic mount;
    an internal combustion engine indirectly connected to the cross beam;
    a second electrical drive unit indirectly connected to the cross beam; and
    a gear unit directly positioned intermediate between the cross beam and the internal combustion engine and also the second electrical drive unit,
    wherein the gear unit is directly connected to the cross beam via a second elastic mount and operatively connected to the first electrical drive unit, the second electrical drive unit and the internal combustion engine.

17. The support and drive arrangement of claim 16, further comprising at least one auxiliary assembly directly connected to the cross beam via a third elastic mount.

18. A support and drive arrangement for a hybrid-electrically driven vehicle, the support and drive arrangement comprising:
    a cross beam attached to a vehicle support structure;
    a first electrical drive unit connected to the cross beam;
    a gear unit connected to the cross beam and the first electrical drive unit; and
    an internal combustion engine connected to the gear unit,
    wherein the gear unit is directly connected to the cross beam via an elastic mount.

19. A support and drive arrangement for a motor vehicle, the support and drive arrangement comprising:
    a cross beam configured for attachment to a vehicle support structure;
    an electrical drive unit directly connected to the cross beam via an elastic mount; and
    an internal combustion engine connected to the electrical drive unit in such a manner that the internal combustion engine is only indirectly connected to the cross beam via the electrical drive unit and the elastic mount.

20. A support and drive arrangement for a motor vehicle, the support and drive arrangement comprising:
    a cross beam configured for attachment to a vehicle support structure;
    an electrical drive unit connected to the cross beam via an elastic mount; and
    an internal combustion engine directly connected to the cross beam via the elastic mount,
    wherein the electrical drive unit is attached to the internal combustion engine in such a manner that the electrical drive unit is only indirectly connected to the cross beam via the internal combustion engine and the elastic mount.

* * * * *